Figure 1:
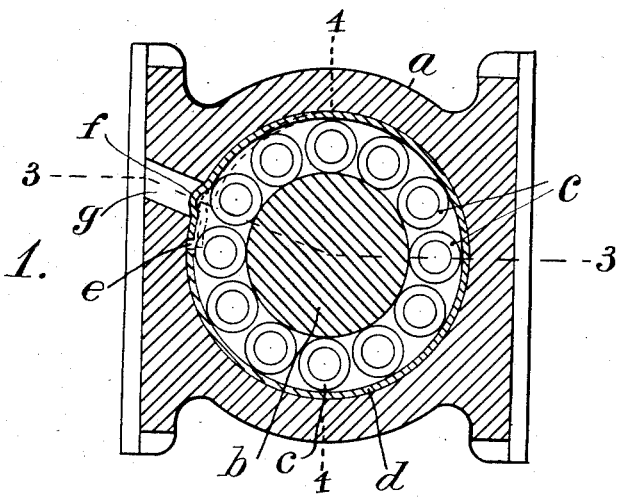

C. I. SHIRLEY.
DETACHABLE LINING FOR ROLLER BEARING CASINGS.
APPLICATION FILED JULY 2, 1908.

926,966.

Patented July 6, 1909.

Witnesses:
L. Lee
J. W. Greenbaum

Inventor
Cephas I. Shirley, per
Thomas S. Crane, Atty.

UNITED STATES PATENT OFFICE.

CEPHAS I. SHIRLEY, OF NEWARK, NEW JERSEY, ASSIGNOR TO HYATT ROLLER BEARING COMPANY, OF HARRISON, NEW JERSEY, A CORPORATION OF NEW JERSEY.

DETACHABLE LINING FOR ROLLER-BEARING CASINGS.

No. 926,966.　　　　Specification of Letters Patent.　　　　Patented July 6, 1909.

Application filed July 2, 1908. Serial No. 441,699.

*To all whom it may concern:*

Be it known that I, CEPHAS I. SHIRLEY, a citizen of the United States, residing at 114 Stone street, Newark, county of Essex, and State of New Jersey, have invented certain new and useful Improvements in Detachable Linings for Roller-Bearing Casings, fully described and represented in the following specification and the accompanying drawings, forming a part of the same.

This invention relates to roller bearing in which anti-friction rolls are inclosed within a cylindrical casing and an axle or shaft supported within the said rolls.

The invention is especially applicable to solid casings which have no removable cap and which cannot be opened to apply or remove a lining. To make such casings of cast metal, which is of unequal texture, it is necessary in order to furnish a durable wearing surface, to apply a steel lining to the casing, which lining may be hardened if required so as to wear much longer than cast metal.

The invention consists in forming a cylindrical lining of sheet metal with a longitudinal division or joint at one side, the lining being made a little larger than the bore of the casing so that it can be pressed elastically therein. The parts of the lining adjacent to the joint are crowded together during such insertion of the lining and form two elastic tongues, one of which is made of suitable flexibility to permit it to be sprung inwardly from the casing. The elasticity of such a tongue is utilized to secure an elastic engagement of the lining with the casing. Such means consists of a projection upon one of these parts and a recess upon the other, and such a detachable connection permits the lining to be applied to the casing by springing the tongue inwardly when the lining is forced within the casing, and permitting the tongue to spring outwardly when the projection reaches and coincides with the recess. The construction also permits the instantaneous removal of the lining from the casing whenever it requires renewal.

By my construction, no detachable fastening is needed and the labor of inserting such fastening, and the risk of losing it, is avoided when applying or removing the lining.

Although the lining is held detachably in the casing, it forms a firm unyielding surface to support the load imposed upon the anti-friction rolls, and wholly protects the original bore of the casing from wear, so that the casing is perfectly adapted to center any subsequent lining fitted therein.

In the present invention, the casing is made of a sheet-metal blank rolled up into cylindrical form with its two ends in proximity, forming when in use an open longitudinal joint at one side of the lining; and any objection to this open joint is obviated by sloping the ends of the blank so that the anti-friction rolls cross the joint gradually in their rotation about the axle.

The invention may be applied to bearings for shafts and axles of all descriptions, and also to the hubs of pulleys, and wheels such as the storing wheels of automobile carriages.

Figure 2:
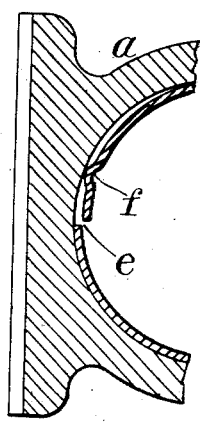
Figure 3:
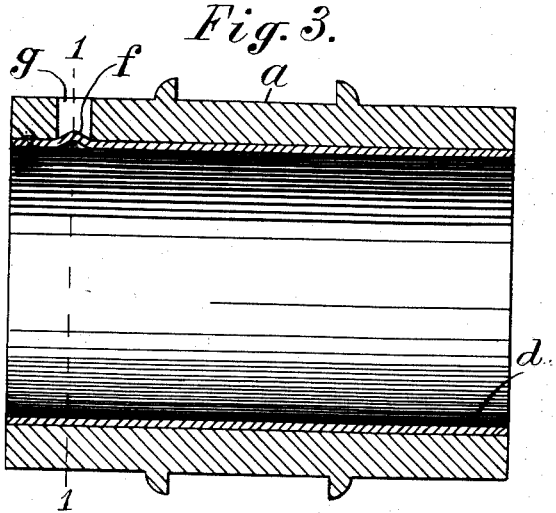
Figure 4:
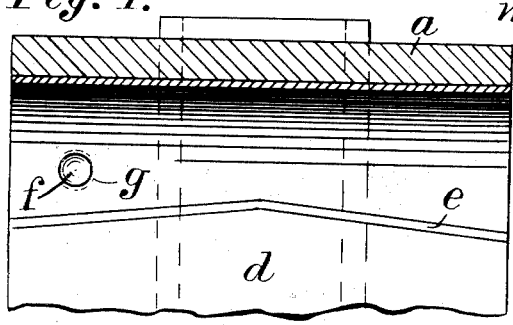
Figure 5:

In the drawing annexed, a car axle box is shown to illustrate the invention, Figure 1 being a cross section on line 1, 1 in Fig. 3; Fig. 2 shows one side of a similar cross section with one edge of the lining sprung in, as when applying it to the casing; Fig. 3 is a cross section on line 3—3 in Fig. 1; Fig. 4 is a cross section on line 4—4 in Fig. 1; and Fig. 5 is a cross section similar to Fig. 3 with a hole in the lining and a stud engaged therewith.

*a* designates the casing having a cylindrical bore, *b* the axle supported therein by anti-friction rolls *c* which are shown of tubular character, and *d* is the lining fitted to the casing and having an open division or joint *e* at one side. Adjacent to the joint, the tongue, along one edge of the lining is shown, in Figs. 1, 2 and 3, having a projection *f* formed by conically indenting the tongue upon the inner side and producing a rounded conical protuberance upon the outer side of the tongue, of sufficient projection to hold the lining from displacement within the casing when such projection is sprung into a suitable recess upon the inner side of the casing. With a solid casing the recess is most conveniently formed by drilling a hole *g* from the outer side through the wall of the casing, and the projection *f* is shown engaged with the inner end of such hole in Figs. 1, 3 and 4.

To apply the lining to the casing, the edge of the tongue upon which the projection *f* is formed is sprung inward sufficiently, as shown in Fig. 2 (and by dotted lines in Fig. 1,) to insert the lining in the end of the casing, the lining then being pushed longitudinally into the casing until the projection coincides with the recess, as shown in Figs. 1, 3 and 4. The inwardly bent edge then springs outward, as shown in Figs. 1 and 3, and the whole lining conforms to the cylindrical shape of the casing, so as to furnish a suitable wearing surface for the rolls. Such a lining may be hardened, if made of suitable thickness to permit the springing inward of a tongue upon one edge when applying it to the casing.

The joint of the casing is shown inclined to the axial line in Fig. 4 to facilitate the passage of the rolls over the joint. As the load usually operates vertically upon the roller bearing or axle, the passage of the rolls over the joint, when supporting the load, can be prevented by arranging the projection and recess which secure the lining in place, so as to bring the joint at the side of the bearing or at any other point where the rolls are free from load.

It is obvious that the recess $g$ and the projection $f$, which fits in the same, operate to prevent either a circular or longitudinal movement of the sleeve, but when the axle and rolls are removed from the bearing the tongue can be readily sprung inward, as shown in Fig. 2, and the lining pushed endwise from the casing and a fresh one substituted. The projection may be formed upon the casing by inserting a suitable stud through the same, and the recess formed by perforating the lining. Such construction is shown in Fig. 5, where the stud is formed as a rivet $k$ inserted through the casing and having its head $l$ upon the inner side of the casing to engage a hole $m$ in the tongue upon the lining. Such hole is formed close to the joint, so as to permit the tongue upon the edge of the sheet metal to be sprung inwardly when inserting the lining in the casing. The two parts (the casing and the tongue upon the lining) can be provided with a projection and recess as cheaply as with any other device for holding the lining detachably in the casing, while the construction avoids the inconvenience of using a separate fastening, or the risk of losing such fastening-piece.

I am aware that an elastic band has been used to retain anti-friction rolls in a groove upon their axle, but not sprung into contact with the bore of the casing to form an unyielding lining therein. Detachable sleeves having no longitudinal joint have also been used and secured detachably in the casing by a loose rivet or pin, but my invention differs from these constructions in having the lining made primarily larger than the bore of the casing and divided so that it can be compressed to force into the casing and the edges adjacent to the longitudinal joint having elasticity, and flexibility sufficient to permit an inward movement for detachably engaging a projection and recess.

Having thus set forth the nature of the invention what is claimed herein is:

1. In a roller bearing, the combination, with a cylindrical casing having an axle $b$ and anti-friction rolls $c$ therein, of a sheet metal lining $d$ divided longitudinally at one side, the lining at one edge of its joint having a flexible tongue pressed elastically outward against the casing, and such tongue and casing being provided with a projection and recess engaged elastically for holding the lining detachably in place, the lining being supported rigidly by the casing, and the rolls being supported by contact with the unyielding lining.

2. In a roller bearing, the combination, with a cylindrical casing having an axle $b$ and anti-friction rolls $c$ therein, of a sheet metal lining $d$ divided longitudinally at one side and adapted to crowd elastically into the casing to form an unyielding lining therein, the lining at one edge of its joint having a flexible tongue pressed elastically outward against the casing, the casing having a recess $g$ and the tongue adjacent to the joint of the lining having a projection $f$ adjacent to the said joint engaged by elastic expansion into such recess to hold the lining in place, and the rolls being supported by contact with the unyielding lining.

In testimony whereof I have hereunto set my hand in the presence of two subscribing witnesses.

CEPHAS I. SHIRLEY.

Witnesses:
AYRES WARD,
R. S. STEENSTRUP.